US009602841B2

(12) United States Patent
Mathew et al.

(10) Patent No.: US 9,602,841 B2
(45) Date of Patent: Mar. 21, 2017

(54) SYSTEM AND METHOD FOR DECODING SCALABLE VIDEO CODING

(71) Applicant: TEXAS INSTRUMENTS INCORPORATED, Dallas, TX (US)

(72) Inventors: Manu Mathew, Bangalore (IN); Mullangi Venkata Ratna Reddy, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 401 days.

(21) Appl. No.: 13/663,707

(22) Filed: Oct. 30, 2012

(65) Prior Publication Data

US 2014/0119436 A1    May 1, 2014

(51) Int. Cl.
  H04N 19/88    (2014.01)
  H04N 19/30    (2014.01)
(52) U.S. Cl.
  CPC ............. *H04N 19/88* (2014.11); *H04N 19/30* (2014.11)
(58) Field of Classification Search
  None
  See application file for complete search history.

(56) References Cited

U.S. PATENT DOCUMENTS

| 5,930,398 | A  | * | 7/1999 | Watney | H04N 5/9264 375/240.01 |
| 7,848,407 | B2 | * | 12/2010 | Yoon | H04N 21/8451 375/240.01 |
| 8,848,787 | B2 | * | 9/2014 | Karczewicz et al. | 375/240.03 |
| 9,355,644 | B2 | * | 5/2016 | Jax | G10L 19/24 |
| 2002/0076043 | A1 | * | 6/2002 | Van Der Vleuten | H04N 19/46 380/37 |
| 2003/0112822 | A1 | * | 6/2003 | Hong | H04L 12/6418 370/469 |
| 2003/0147463 | A1 | * | 8/2003 | Sato | H04N 19/40 375/240.05 |
| 2004/0264791 | A1 | * | 12/2004 | Jiang | H04N 19/00 382/239 |
| 2005/0002575 | A1 | * | 1/2005 | Joshi | H04N 19/59 382/232 |
| 2006/0078049 | A1 | * | 4/2006 | Bao | H04N 19/13 375/240.11 |
| 2006/0153294 | A1 | * | 7/2006 | Wang et al. | 375/240.08 |

(Continued)

*Primary Examiner* — Dave Czekaj
*Assistant Examiner* — Mohammad J Rahman
(74) *Attorney, Agent, or Firm* — Robert D. Marshall, Jr.; Charles A. Brill; Frank D. Cimino (57) ABSTRACT

A system and method for decoding video encoded using scalable video coding. In one embodiment, a decoder for scalable video coding (SVC) includes an SVC access unit analyzer and decoding logic. The SVC access unit analyzer is configured to examine an SVC access unit prior to layered decoding of the access unit, to determine, based on the examination, what operations the access unit specifies for each layer of the decoding, and to determine, based on the determined operations to be performed for each layer of the decoding, what data to store for use by a subsequent layer of the decoding. The decoding logic is configured to decode the access unit via a plurality of decoding layers; and to store at each decoding layer, for use by a subsequent decoding layer, the data determined by the SVC access unit analyzer to be used by the subsequent decoding layer.

28 Claims, 3 Drawing Sheets

(56) References Cited

U.S. PATENT DOCUMENTS

| | | | |
|---|---|---|---|
| 2006/0153295 A1* | 7/2006 | Wang | H04N 19/159 375/240.08 |
| 2006/0155531 A1* | 7/2006 | Miller | 704/219 |
| 2006/0262985 A1* | 11/2006 | Chen et al. | 382/240 |
| 2007/0036224 A1* | 2/2007 | Srinivasan et al. | 375/240.18 |
| 2007/0110163 A1* | 5/2007 | Kodama | H04N 19/172 375/240.21 |
| 2007/0160143 A1* | 7/2007 | Lee | 375/240.15 |
| 2008/0031347 A1* | 2/2008 | Segall | H04N 19/46 375/240.19 |
| 2008/0193033 A1* | 8/2008 | Choi et al. | 382/251 |
| 2008/0219354 A1* | 9/2008 | Segall | H04N 19/176 375/240.23 |
| 2009/0097548 A1* | 4/2009 | Karczewicz et al. | 375/240.03 |
| 2010/0074333 A1* | 3/2010 | Au et al. | 375/240.12 |
| 2010/0189182 A1* | 7/2010 | Hannuksela | H04N 21/234327 375/240.25 |
| 2011/0075734 A1* | 3/2011 | Sakazume | H04N 19/70 375/240.12 |
| 2011/0182353 A1* | 7/2011 | Bae | H04L 65/607 375/240.02 |
| 2011/0194643 A1* | 8/2011 | Kim | H04L 1/007 375/295 |
| 2011/0274178 A1* | 11/2011 | Onno et al. | 375/240.25 |
| 2011/0286526 A1* | 11/2011 | Nakagami et al. | 375/240.16 |
| 2012/0022878 A1* | 1/2012 | Chen et al. | 704/500 |
| 2012/0057631 A1* | 3/2012 | Le Leannec | H04N 19/56 375/240.16 |
| 2012/0207209 A1* | 8/2012 | Kokalj-Filipovic et al. | 375/240.03 |
| 2012/0224625 A1* | 9/2012 | Wang et al. | 375/240.03 |
| 2012/0232909 A1* | 9/2012 | Terriberry et al. | 704/500 |
| 2012/0269267 A1* | 10/2012 | Choi | H04N 19/597 375/240.13 |
| 2013/0030795 A1* | 1/2013 | Sung et al. | 704/203 |
| 2013/0064462 A1* | 3/2013 | Ninan et al. | 382/233 |
| 2013/0083845 A1* | 4/2013 | Yu et al. | 375/240.03 |
| 2013/0208792 A1* | 8/2013 | He | H04N 19/00569 375/240.12 |
| 2014/0002598 A1* | 1/2014 | Kim et al. | 348/43 |
| 2014/0105278 A1* | 4/2014 | Bivolarsky | 375/240.03 |
| 2014/0169466 A1* | 6/2014 | Liu | H04N 19/593 375/240.12 |
| 2015/0103902 A1* | 4/2015 | Li | H04N 19/30 375/240.12 |
| 2015/0281733 A1* | 10/2015 | Fu | H04N 19/597 375/240.16 |

* cited by examiner

SYSTEM AND METHOD FOR DECODING SCALABLE VIDEO CODING

BACKGROUND

Scalable video coding (SVC) is a video coding standard defined as a sub-standard of the H.264 video coding standard promulgated jointly by the International Organization for Standardization ("ISO") and the International Telecommunications Union ("ITU"). Using SVC, a video stream can be coded in multiple layers, where each layer provides a representation of the video at a given spatial resolution, temporal resolution, and/or quality level. An SVC video stream includes a base layer and one or more enhancement layers. Video images can be reconstructed from the video stream using only the base layer to generate fundamental images that may be of relatively low quality. The base and enhancement layers may be used together to generate higher quality video images. Accordingly, video data encoded using SVC is decoded in layers.

SUMMARY

A system and method for decoding video encoded using scalable video coding are disclosed herein. In one embodiment, a decoder for scalable video coding (SVC) includes an SVC access unit analyzer and decoding logic. The SVC access unit analyzer is configured to examine an SVC access unit prior to layered decoding of the access unit, to determine, based on the examination, what operations the access unit specifies for each layer of the decoding, and to determine, based on the determined operations to be performed for each layer of the decoding, what data to store for use by a subsequent layer of the decoding. The decoding logic is configured to decode the access unit via a plurality of decoding layers; and to store at each decoding layer, for use by a subsequent decoding layer, the data determined by the SVC access unit analyzer to be used by the subsequent decoding layer.

In another embodiment, a method for decoding SVC includes analyzing an SVC access unit prior to layered decoding of the access unit. The analyzing includes determining, for each layer of the decoding specified by the access unit, what decoding operations the layer is to perform, and what data the layer is to store for use by a subsequent layer. The access unit is decoded via a plurality of decoding layers. The method further includes storing at each decoding layer for use by a subsequent layer the data determined by the analyzing to be stored for use by a subsequent layer.

In an additional embodiment, a system for decoding SVC includes an SVC access unit analyzer. The SVC access unit analyzer is configured to analyze an SVC access unit prior to layered decoding of the access unit via a plurality of decoding layers, to determine, based on the analysis, for each decoding layer specified by the access unit, what interlayer data the decoding layer requires from a prior decoding layer, and to direct a given decoding layer to store only one of un-quantized transform coefficient values and quantized transform coefficient level values for use by a subsequent decoding layer based on access unit information specifying operation of the subsequent decoding layer.

BRIEF DESCRIPTION OF THE DRAWINGS

For a detailed description of exemplary embodiments of the invention, reference will now be made to the accompanying drawings in which.

Notation and Nomenclature

Certain terms are used throughout the following description and claims to refer to particular system components. As one skilled in the art will appreciate, companies may refer to a component by different names. This document does not intend to R distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Each layer for decoding of video data encoded in accordance with the scalable video coding (SVC) standard is similar to an H.264 decoder. However, the SVC decoding layers include additional functionalities over those provided by H.264. One such additional functionality is inter-layer prediction, which applies intermediate data generated by a previous layer (referred to as a "reference layer") to perform decoding. Several different types of intermediate data may be exchanged between layers of an SVC decoder. The types of intermediate data include residual samples (rS), constructed samples (cS), un-quantized transform coefficients (sTCoeff), quantized transform coefficient levels (tCoefflevel), and various other macroblock header information (e.g., macroblock and sub-macroblock types, motion vectors, etc.). The intermediate data shared between decoder layers may be referred to as inter-layer data.

An SVC encoded video stream (i.e., bit-stream of SVC encoded video data) includes no headers that provide information about the overall video stream. Instead, each layer includes sequence/picture parameters (SPS/PPS) and slice headers that provide information regarding the inter-layer data required by that layer. Consequently, conventional SVC decoders store at each layer all possible inter-layer data that may be needed by a subsequent layer. The size of the inter-layer data is dependent on the size of layers being decoded. To decode high-definition video resolutions the inter-layer data can be large, and a large amount of storage is therefore required to contain the data. For example, SVC decoding may require 200% more memory per layer than H.264 decoding, and require 3-4 times the memory bandwidth to transfer the larger amount of data. Such increases in storage and bandwidth can result in undesirable increases in decoder hardware cost and power consumption when compared to H.264 decoders.

Embodiments of the SVC decoders disclosed herein pre-parse the video stream to be decoded, and determine from the pre-parsing what layers are required to be decoded, and what inter-layer data is required by each layer. Based on results of the pre-parsing, embodiments of the present disclosure store at each decoding layer only inter-layer data needed by a subsequent decoding layer, thereby reducing per layer storage and bandwidth requirements, which in-turn lowers SVC decoder cost and power-consumption.

Figure 1:
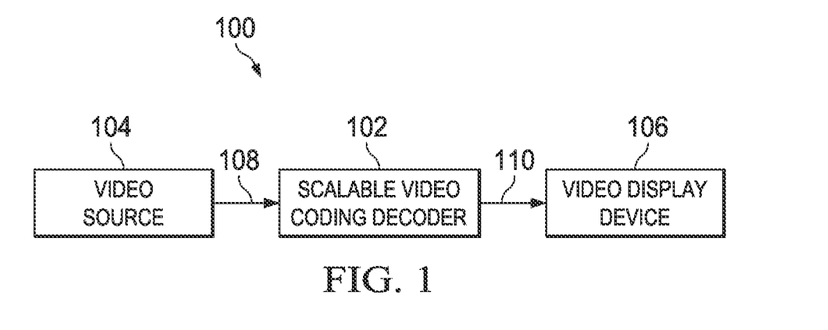
FIG. 1 shows a block diagram for a system for providing video in accordance with various embodiments.

FIG. 1 shows a block diagram for a system 100 for providing video in accordance with various embodiments. The system 100 includes a video source 104, a video decoder 102, and video display device 106. The video source 104 may be a storage device suitable for storing video, such as magnetic or optical disks, semiconductor memory, etc. Alternatively, the video source 104 may be receiving device that detects video transmitted over a medium (e.g., a wired or wireless medium) and extracts the transmitted video stream therefrom. The video stream 108 provided by the video source is a bit-stream encoded using scalable video coding (SVC) and consequently, may require multiple layers of decoding to generate video images suitable for display on the video display device 106.

The SVC decoder 102 is configured to provide layered decoding for a video stream 108 encoded using scalable video coding. The SVC decoder 102 may be further configured to decode the video stream 108 into video 110 in accordance with the display capabilities of the video rendering device 106. The video display device 106 may be any device or technology capable of displaying video (e.g., a liquid crystal, plasma, organic light emitting diode, cathode ray tube, or other type of display).

Embodiments of the SVC decoder 102 may be configured to provide improved efficiency (e.g., longer battery life) and lower cost than conventional SVC decoders by reducing the memory required to store, and the bandwidth required to transfer, inter-layer data between decoding layers. The decoding layers of the SVC decoder 102 are managed by an access unit analyzer that pre-parses the video stream 108 to determine what operations are to be performed in the decoding layers to decode the video stream 108. Based on the determined operations, the access unit analyzer directs each decoding layer to store inter-layer data including only the inter-layer data to be used by the operations of a subsequent decoding layer.

Figure 2:
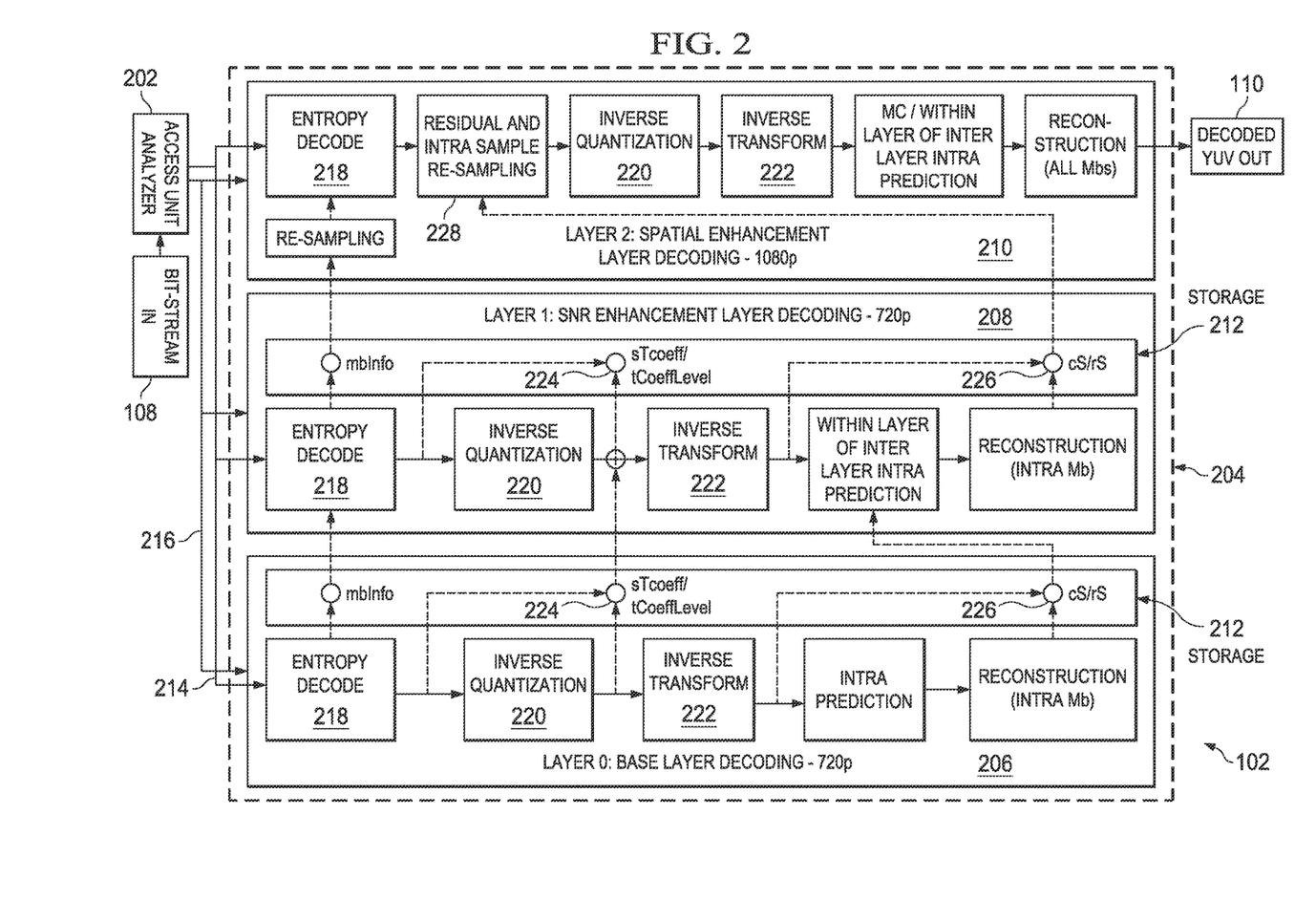
FIG. 2 shows a block diagram for a scalable video coding (SVC) decoder in accordance with various embodiments.

FIG. 2 shows a block diagram for the SVC decoder 102 in accordance with various embodiments. The SVC decoder 102 includes an access unit analyzer 202 and multi-layer decoding logic 204. The decoding logic 204 includes a plurality of processing layers that are applied to an input video stream 108 to decode images. In the embodiment of FIG. 2, the SVC decoder 102 is illustrated with three layers 206, 208, 210, where layer 206 provides base layer decoding, layer 208 provides signal-to-noise ratio enhancement (quality improvement), and layer 210 provides spatial enhancement (change in picture size). Other embodiments of the SVC decoder 102 may include more or fewer layers, a different layer order, and/or different decoding functionality as needed to decode a given video stream.

Each decoding layer 206-210 includes various processing modules that provide decoding functionality. For example, each of the decoding layers 206-210 includes an entropy decode module 218 receiving video data 214 from access unit analyzer 202, an inverse quantization module 220, an inverse transform module 222, and various other modules providing decoding functionality. The decoding layers (e.g., layers 206, 208) also include storage 212 for storing inter-layer data. The storage 212 may be volatile random access memory. In some embodiments, because the inter-layer data is large, the storage 212 is external to a device providing the processing modules and decoding functionality of the decoding layers 206-210.

As noted above, the inter layer information required by a given layer may not be known to a lower layer because the needed inter-layer data depends on parameters provided in SPS and slice headers of the given layer. The SVC video stream 108 is arranged in access units, where an access unit includes the slices and layers that are needed to decode one complete picture of the video. The access unit analyzer 202 examines the access units of the video stream 108, and manages operation of the decoding logic 204 based on the content of the access units. This includes transmission of layer data 216 to decoding layers 206-210.

Figure 3:
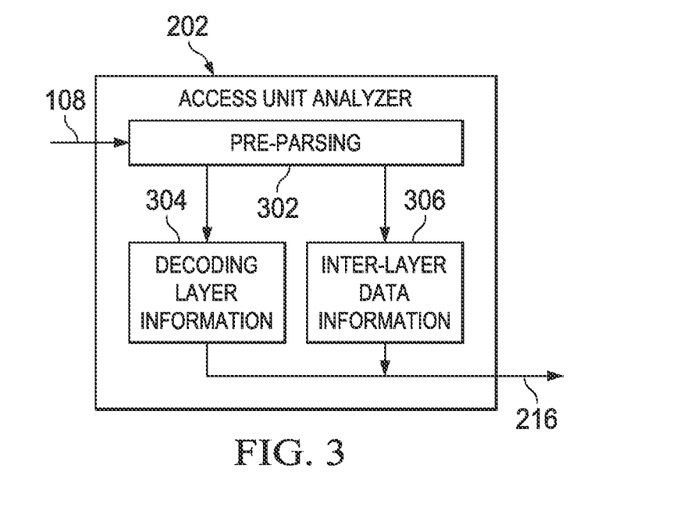
FIG. 3 shows a block diagram for an access unit analyzer for use with an SVC decoder in accordance with various embodiments.

FIG. 3 shows a block diagram for the access unit analyzer 202 in accordance with various embodiments. The access unit analyzer 202 includes pre-parsing logic 302. The pre-parsing logic 302 analyzes each access unit of the video stream 108 before the access unit is processed by the decoding logic 204. For example, the pre-parsing logic 302 examines the SPS and slice headers of each layer of the access unit, and identifies what decoding layers (what decoding operations) are to be applied to the access unit. Based on the identified decoding layers/operations, the pre-parsing logic 302 determines what inter-layer data will be used by each decoding layer. Information identifying the applied decoding layers and inter-layer data are referenced as a decoding layer information 304 and inter-layer data information 306 respectively. The access unit analyzer 202 uses the decoding layer information 304 and inter-layer data information 306 to manage the decoding logic 204, such that the number of decoding layers utilized and the amount of inter-layer data stored and transferred is reduced. Decoding layer information 304 and inter-layer data information 306 produce the layer data 216.

The pre-parsing logic 302 is configured to determine whether decoding layers specified in the access unit are needed to produce decoded video for display on the video display device 106. For example, if an access unit specifies three decoding layers 0-2, where both layers 1 and 2 use layer 0 as reference (i.e., layers 1 and 2 apply data from layer 0 for decoding, and not from each other), then the pre-parsing logic 302 may select one of layers 1 and 2 for implementation, and specify that the other layer not be implemented. Thus, if the parameters of video display device 106 (e.g., display resolution) indicate that the output of layer 2 should be provided for display, then the pre-parsing logic 302 may select layers 0 and 2 for implementation, and not implement layer 1.

Referring now to FIGS. 2 and 3, the pre-parsing logic 302 is also configured to identify a variety of decoding layer operational arrangements that allow for reduction in the amount of stored inter-layer data. If the pre-parsing logic 302 determines, based on examination of an access unit, that a given decoding layer (e.g., layer 208) is an SNR enhancement layer, then the inter-layer data to be stored by the layer preceding the given decoding layer need not include tCoeffLevel and rS values because the SNR enhancement layer does not use tCoeffLevel and rS values. Similarly, if the pre-parsing logic 302 determines, based on examination of an access unit, that a given decoding layer (e.g., layer 210) is a spatial enhancement layer, then the inter-layer data to be stored by the layer preceding the given decoding layer need not include tCoeffLevel and sTCoeff values because the spatial enhancement layer does not use tCoeffLevel and sTCoeff values.

In some embodiments, the pre-parsing logic 302 determines whether a layer of interest of the decoding logic 204 needs to store tCoeffLevel for use by a subsequent layer by examining a flag value (tcoeff_level_prediction_flag) derived from subset sequence parameter set (SSPS) and slice headers of a decoding layer of the access unit subsequent to the layer of interest. The process for deriving tcoeff_level_prediction_flag is specified in the H.264/SVC specification. If tcoeff_level_prediction_flag is set to TRUE, then the pre-parsing logic 302 designates tCoeffLevel to be stored by the layer of interest for use by the subsequent decoding layer. Otherwise tCoeffLevel is not needed by the subsequent decoding layer and need not be stored by the layer of interest while decoding the access unit.

The pre-parsing logic 302 may also determine whether sTCoeff is used by a given layer, and thus determine whether the preceding decoding layer should store sTCoeff. sTCoeff is used by the given layer if the given layer is an SNR enhancement layer and if tcoeff_level_prediction_flag is not set to TRUE. There are two types of SNR enhancement layers: medium grain scalable (MGS) and coarse grain scalable (CGS). To determine whether a layer is an SNR enhancement layer the pre-parsing logic 302 determines whether the layer is either of an MGS or CGS layer. The pre-parsing logic 302 identifies MGS layers using the quality_id syntax element in the network abstraction layer (NAL) unit header. Because there is no particular syntax element identifying a CGS enhancement layer, the pre-parsing logic 302 examines the SpatialResolutionChangeFlag, which is a derived flag as explained in the H.264/SVC specification. Thus, if the pre-parsing logic 302 determines that the given layer is not an SNR layer or that the tcoeff_level_prediction_flag of given layer is set to true, then the decoding layer preceding the given layer need not store sTCoeff.

Embodiments of the decoding logic 204 further reduce the amount of inter-layer storage implemented by employing unified/shared buffers to store complementary types of inter-layer data. tCoeffLevel and sTCoeff are complimentary in that when tCoeffLevel is required by a subsequent decoding layer, sTCoeff is not required by the subsequent decoding layer, and vice versa. Accordingly, embodiments of decoding layers 206, 208 (and various other decoding layers) include a unified sTCoeff/tCoeffLevel buffer 224. The unified sTCoeff/tCoeffLevel buffer 224 is used to store one of sTCoeff and tCoeffLevel based on the operation of the decoding layer receiving input from the buffer 224 as determined and specified by the pre-parsing logic 302.

Embodiments of the decoding layers 206, 208 (and various other decoding layers) may also include a unified cS/rS buffer 226. rS values are residual samples and, in SVC, are non-zero only for inter samples. cS values are constructed samples of reference layers and in SVC; are non-zero only for intra samples. Thus, rS and cS are complementary and combined in the single unified/shared cS/rS buffer 226. Additionally, by combining cS and rS storage in the single unified cS/rS buffer 226, the decoding layers 206, 208 may include a single buffer controller (e.g., tCoeffLevel/sTCoeff buffer controller (not shown)) for module-to-module communication in the layers 206-208, thereby reducing the internal bandwidth required for communication between modules.

In the SVC decoding process, rS and cS may be required for decoding a spatial enhancement layer, but for a given macroblock and a given pixel, only one of a cS sample and an rS sample is needed. The spatial enhancement layer 210 of the decoding logic 204 includes a resampling module 228. The resampling module 228 uses cS samples from the cS/rS buffer 226 if the reference layer macroblock type is intra and uses a zeroed sample otherwise. Similarly, the resampling module 228 uses rS samples from the cS/rS buffer 226 if the reference layer macroblock type is inter and uses a zeroed sample otherwise. Thus, the resampling module 228 constructs cS and rS to be used in the spatial enhancement layer 228 from the combined cS/rS buffer.

In a spatial enhancement layer 210, whether a given pixel position requires cS or rS value depends on base_mode_flag in the macroblock header and on the reference layer macroblock modes of the macroblocks (there may be several such modes) covered by the scaled spatial enhancement layer macroblock. The resampling module 228 determines whether a given pixel position needs cS or rS based on the value of base_mode_flag of the current macroblock header. The entropy decode module 218 provides the value of base_mode_flag of the current macroblock header to the combined cS/rS resampling module 228. Consequently, the cS/rS re-sampling module 228 can output a combined set of cS/rS values for module-to-module communication in the spatial enhancement layer 210. In conjunction with the cS and rS values, the cS/rS resampling module 228 may also output information indicating which pixels are cS and which pixels are rS.

Macroblock based conditional fetching, as described with regard to fetching cS and rS by the re-sampling module 228, can also be applied to conditional fetching of sTCoeff and tCoeffLevel values from the unified sTCoeff/tCoeffLevel buffer 224. Analysis indicates that approximately 50% of the macroblocks in a typical SVC video stream 108 may benefit from macroblock based conditional fetching, thereby further reducing the memory bandwidth required to fetch inter-layer data.

The SVC decoder 102 may be implemented as a dedicated hardware decoding device operated as a standalone video decoder, implemented in a video processor, and/or coupled to a processor as a video decoder peripheral. In some embodiments, at least some functionality of the SVC decoder 102 may be implemented by a processor executing software instructions retrieved from a non-transitory computer-readable storage device, such as semiconductor memory. Some embodiments of the SVC video decoder 102 include access unit analysis and/or decoding logic functionality provided by dedicated hardware and/or a processor executing software instructions.

Figure 4:
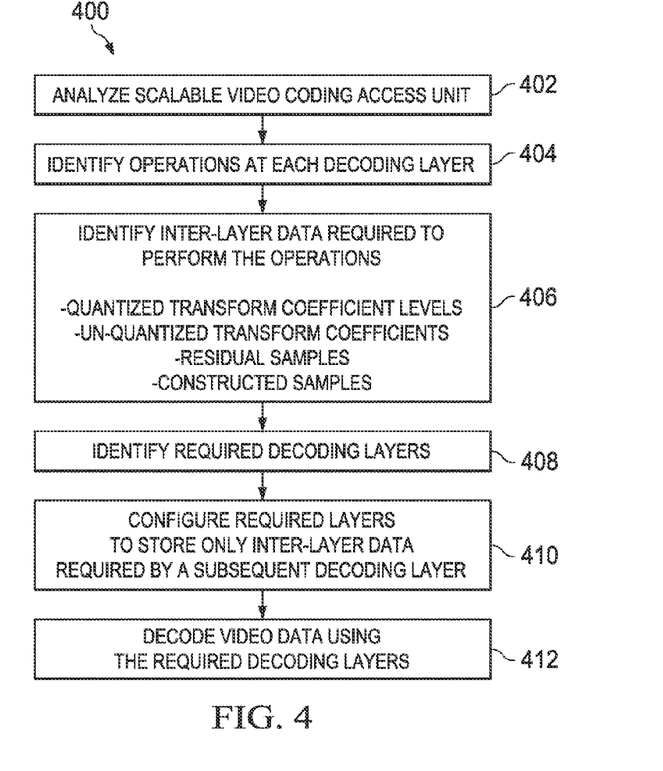
FIG. 4 shows a flow diagram for a method for decoding SVC in accordance with various embodiments.

FIG. 4 shows a flow diagram for a method 400 for decoding a video stream encoded using SVC in accordance with various embodiments. Though depicted sequentially as a matter of convenience, at least some of the actions shown can be performed in a different order and/or performed in parallel. Additionally, some embodiments may perform only some of the actions shown. At least some of the operations of the method 400 can be performed by a processor executing instructions read from a computer-readable storage device.

In block 402, the SVC decoder 102 is receiving the SVC encoded video stream 108. The SVC encoded video stream 108 includes a plurality of access units. Each access unit specifies layered decoding for a picture of the video. The access unit analyzer 202 of the SVC decoder 102 examines each access unit before the access unit is decoded by the decoding logic 204. The access unit analyzer 202 may examine the SPS and slice headers of each layer.

In block 404, the access unit analyzer 202 identifies the decoding operations to be performed in each layer of decoding specified in the examined access unit.

In block 406, the access unit analyzer 202 identifies inter-layer data to be stored by the layers 206-208 of the decoding logic 204. Particular inter-layer data is identified as needing to be stored based on a subsequent layer's use of the inter-layer data to perform decoding. The access unit analyzer 202 may determine whether a given decoding layer uses tCoeffLevel based, for example, on a coefficient level prediction flag of the given decoding layer being TRUE. The access unit analyzer 202 may determine whether a given decoding layer uses sTCoeff based, for example, on the given layer being an SNR enhancement layer and a coefficient level prediction flag of the given decoding layer being FALSE.

In block 408, the access unit analyzer 202 determines which of the layers of decoding specified by the access unit to implement to decode the access unit for display on the video display device 106. The access unit analyzer 202 may specify that fewer than all the layers of decoding specified in the access unit be implemented based on the parameters of the display device 106 and the layers of decoding needed to produce images corresponding to those parameters (i.e., images suitable for display on the display device 106).

In block 410, the access unit analyzer 202 configures the decoding logic 204 to decode the access unit using the determined decoding layers, and configures the decoding layers to store only inter-layer data required by an implemented subsequent decoding layer to decode the access unit.

In block 412, the access unit is decoded using the decoding layers selected by the access unit analyzer 202. Each decoding layer stores only inter-layer data needed by a subsequent decoding layer, as identified by the access unit analyzer 202. Each decoding layer retrieves inter-layer data from an inter-layer data buffer as needed to perform decoding.

Figure 5:
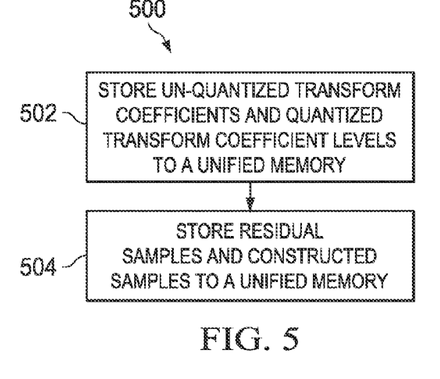
FIG. 5 shows a flow diagram for a method for storing inter-layer data in an SVC decoder in accordance with various embodiments.

FIG. 5 shows a flow diagram for a method 500 for storing inter-layer data in the SVC decoder 102 in accordance with various embodiments. Though depicted sequentially as a matter of convenience, at least some of the actions shown can be performed in a different order and/or performed in parallel. Additionally, some embodiments may perform only some of the actions shown. At least some of the operations of the method 500 can be performed by a processor executing instructions read from a computer-readable storage medium. In the method 500, the SVC decoder 102 is performing layered decoding of an access unit. The operations of the method 500 may be performed as part of block 412 of FIG. 4.

In block 502, each decoding layer (e.g., layers 206, 208) stores inter-layer data specified by the access unit analyzer 202 as being needed for use in decoding operations to be performed by a subsequent decoding layer. A decoding layer 206, 208 may store one of sTCoeff and tCoeffLevel values in a shared sTCoeff/tCoeffLevel buffer 224 as specified by the access unit analyzer 202.

In block 504, each decoding layer 206, 208 may store one of a cS value and an rS value for a pixel in a shared cS/rS buffer 226. Each decoding layer 206, 208 may store only non-zero cS values and rS values.

Figure 6:
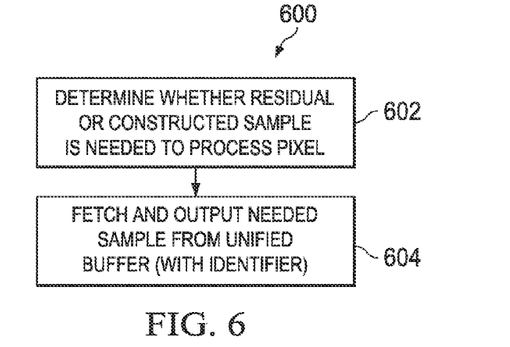
FIG. 6 shows a flow diagram for a method for retrieving inter-layer data in and SVC decoder in accordance with various embodiments.

FIG. 6 shows a flow diagram for a method 600 for retrieving inter-layer data in an SVC decoder 102 in accordance with various embodiments. Though depicted sequentially as a matter of convenience, at least some of the actions shown can be performed in a different order and/or performed in parallel. Additionally, some embodiments may perform only some of the actions shown. At least some of the operations of the method 600 can be performed by a processor executing instructions read from a computer-readable storage medium. In the method 600, the SVC decoder 102 is performing layered decoding of an access unit. The operations of the method 600 may be performed as part of block 412 of FIG. 4.

In block 602, each decoding layer 208, 210 determines what inter-layer data is needed to performing decoding in the layer. Needed inter-layer data is fetched from inter-layer data buffers 224, 226 loaded by a preceding decoding layer. If a decoding layer is a spatial enhancement layer (e.g., layer 210), then the layer determines whether an rS value or a cS value is needed to process a pixel. The determination may be based on whether an inter or intra macroblock is being processed. An entropy decoding module 218 that precedes the resampling module 228 in the spatial enhancement layer processing pipeline may provide macroblock header information indicating whether the macroblock in inter or intra to the resampling module 228 for making the determination.

In block 604, each decoding layer 208, 201 retrieves needed inter-layer data from the inter-layer data buffers 224, 226. If cS and rS values are needed, then the resampling module 228 fetches one of the cS and rS values from a shared cS/rS buffer 226, and outputs a sample. The resampling module 228 may output an identifier with the sample identifying whether the output sample is cS or rS.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A decoder for scalable video coding (SVC), comprising:
an SVC access unit analyzer configured to:
examine an SVC access unit prior to layered decoding of the access unit;
determine, based on the examination, what operations the access unit specifies for each layer of the decoding;
determine, based on the determined operations to be performed for each layer of the decoding, what subset of data decoded by each layer of the decoding is required by a subsequent layer of the decoding;

decoding logic configured to:
  decode the access unit via a plurality of decoding layers;
  store at each decoding layer, for use by a subsequent decoding layer, only the data determined by the SVC access unit analyzer required by the subsequent decoding layer.

2. The decoder of claim 1, wherein the SVC access unit analyzer is configured to:
  determine whether a given decoding layer requires quantized transform coefficient level values from a previous decoding layer to decode the access unit; and
  direct the previous decoding layer to store the quantized transformed coefficient level values generated by the previous layer based on the determination.

3. The decoder of claim 2, wherein the SVC access unit analyzer is configured to determine whether the given decoding layer requires quantized transform coefficient level values from the previous decoding layer based on a coefficient level prediction flag being true; wherein the coefficient level prediction flag is derived from a subset sequence parameter set and slice header of the given decoding layer.

4. The decoder of claim 1, wherein the SVC access unit analyzer is configured to:
  determine whether a given decoding layer requires un-quantized transform coefficient values from a previous decoding layer to decode the access unit; and
  direct the previous decoding layer to store the transform coefficient level values generated by the previous layer based on the determination.

5. The decoder of claim 4, wherein the SVC access unit analyzer is configured to determine whether the given decoding layer requires un-quantized transform coefficient values based on the given layer being a signal to noise ratio/quality enhancement layer and a coefficient level prediction flag being false.

6. The decoder of claim 1, wherein the SVC access unit analyzer is configured to:
  determine what layers of the decoding are needed to decode the access unit; and
  process the access unit in only the needed decoding layers; wherein fewer than all the decoding layers specified in the access unit are needed to decode the access unit.

7. The decoder of claim 1, further comprising memory arranged to store data to be used by a subsequent decoding layer; wherein a portion of the memory is reserved to selectively store either of un-quantized transform coefficient values and quantized transform coefficient level values; and wherein the SVC access unit analyzer is configured to direct a given decoding layer, based on the operations the access unit specifies for the subsequent decoding layer, to selectively store one of un-quantized transform coefficient level value and quantized transform coefficient level value in the portion of memory.

8. The decoder of claim 1, further comprising:
  memory arranged to store data to be used by a subsequent decoding layer;
  wherein a portion of the memory is reserved to selectively store either of residual samples and constructed samples;
  wherein a given decoding layer is configured to store only values in blocks in which residual samples and constructed samples are expected to by non-zero in the portion of the memory;
  wherein the given decoding layer is configured to determine which of the residual samples and the constructed samples to store in the portion of memory based on a determination that one of the residual samples and the constructed samples is zero thereby indicating which of the residual samples and constructed samples are expected to by non-zero.

9. The decoder of claim 8, wherein the subsequent decoding layer is a spatial enhancement layer and comprises a resampling module configured to:
  fetch a constructed sample from the portion of the memory based on an intra macroblock type being processed; and
  fetch a residual sample from the portion of memory based on an inter macroblock type being processed.

10. The decoder of claim 8, wherein the subsequent layer is a spatial enhancement layer, and comprises:
  an entropy decode module; and
  a resampling module coupled to an output of the entropy decode module and coupled to the portion of memory, the resampling module configured to:
    determine which of a constructed sample and a residual sample is required to process a given pixel based on information provided by the entropy decode module;
    output, based on the determination, one of a constructed sample and a residual sample, and information indicating which of a constructed sample and a residual sample is being output.

11. The decoder of claim 1, wherein a decoding layer comprises:
  an entropy decode module that provides macroblock header information to the decoding layer;
  wherein the decoding layer is configured to determine, based on the macroblock header information, whether to fetch decoding information generated by a prior decoding layer to process a current macroblock in the decoding layer.

12. A method for decoding scalable video coding (SVC), comprising:
  analyzing an SVC access unit prior to layered decoding of the access unit, the analyzing comprising determining, for each layer of the decoding specified by the access unit, what decoding operations the layer is to perform, and what subset of data decoded by each layer of the decoding is required by a subsequent layer of the decoding;
  decoding the access unit via a plurality of decoding layers; and
  storing at each decoding layer for use by a subsequent layer only the data determined by the analyzing to be required by a subsequent layer.

13. The method of claim 12, further comprising:
  determining whether a given decoding layer requires quantized transform coefficient level values from a previous decoding layer to decode the access unit; and
  directing a previous decoding layer to store the quantized transformed coefficient level values generated by the previous layer based on the determining.

14. The method of claim 13, wherein the determining comprises:
  deriving a coefficient level prediction flag from a subset sequence parameter set and slice header of the given decoding layer; and
  determining that the given decoding layer requires quantized transform coefficient level values from the previous decoding layer based on the flag being true.

15. The method of claim 12, further comprising:
- determining whether a given decoding layer requires un-quantized transform coefficient values from a previous decoding layer to decode the access unit; and
- directing the previous decoding layer to store the transform coefficient level values generated by the previous layer based on the determining.

16. The method of claim 15, wherein the determining comprises:
- deriving a coefficient level prediction flag from a subset sequence parameter set and slice header of the given decoding layer; and
- determining that the given decoding layer requires un-quantized transform coefficient values based on the given layer being a signal to noise ratio/quality enhancement layer and the coefficient level prediction flag being false.

17. The method of claim 12, further comprising:
- determining, by the analyzing, what layers of the decoding are needed to decode the access unit; and
- processing the access unit in only the needed decoding layers; wherein fewer than all the decoding layers specified in the access unit are needed to decode the access unit.

18. The method of claim 12, further comprising selectively storing in a single memory location external to a decoding layer either of an un-quantized transform coefficient value and a quantized transform coefficient level value based on the operations the access unit specifies for the subsequent decoding layer.

19. The method of claim 12, further comprising:
- selectively storing in a single memory location external to a decoding layer either of a non-zero residual sample and a non-zero constructed sample;
- fetching the constructed sample from the memory based on an intra macroblock type being processed; and
- fetching the residual sample from the memory based on an inter macroblock type being processed.

20. The method of claim 19, further comprising:
- determining which of the constructed sample and the residual sample is required to process a given pixel based on information provided by an entropy decode module of a decoding layer;
- output, based on the determining, one of the constructed sample and the residual sample fetched from the memory, and information indicating which of the constructed sample and the residual sample is being output.

21. The method of claim 12, further comprising determining, in a decoding layer, based on macroblock header information provided by an entropy coding block of the decoding layer, whether to fetch decoding information generated by a prior decoding layer to process a current macroblock in the decoding layer.

22. A system for decoding scalable video coding (SVC), comprising:
- an SVC access unit analyzer configured to:
  - analyze an SVC access unit prior to layered decoding of the access unit via a plurality of decoding layers;
  - determine, based on the analysis, for each decoding layer specified by the access unit, whether un-quantized transform coefficient values or quantized transform level values are required from the prior decoding layer for decoding by the decoding layer; and
  - direct a given decoding layer to store only one of un-quantized transform coefficient values and quantized transform coefficient level values for use by a subsequent decoding layer based on access unit information specifying operation of the subsequent decoding layer.

23. The system of claim 22, wherein the SVC access unit analyzer is configured to:
- direct the given decoding layer to store only the un-quantized transform coefficient values based on the analysis indicating that the subsequent layer is a signal to noise ratio/quality enhancement layer and a transform coefficient level prediction flag for the subsequent layer is false; and
- direct the given decoding layer to store only the quantized transform coefficient level values based on the analysis indicating that the transform coefficient level prediction flag for the subsequent layer is true.

24. The system of claim 22, wherein the SVC access unit analyzer is configured to direct a given decoding layer to store only non-zero residual samples and non-zero constructed samples in a same memory buffer for use by a subsequent decoding layer.

25. The system of claim 24, wherein the subsequent decoding layer is a spatial enhancement layer and comprises a resampling module configured to:
- fetch a non-zero constructed sample from the memory buffer based on an intra macroblock type being processed; and
- fetch a non-zero residual sample from the memory buffer based on an inter macroblock type being processed.

26. The system of claim 24, wherein the subsequent layer is a spatial enhancement layer, and comprises:
- an entropy decode module; and
- a resampling module coupled to an output of the entropy decode module and coupled to the portion of memory, the resampling module configured to:
  - determine which of a non-zero constructed sample and a non-zero residual sample is required to process a given pixel based on information provided by the entropy decode module;
  - output, based on the determination, one of the non-zero constructed sample and the non-zero residual sample, and information indicating which of the constructed sample and the residual sample is being output.

27. The system of claim 22, wherein the SVC access unit analyzer is configured to:
- determine what layers of the decoding are needed to decode the access unit for use by a given device; and
- process the access unit in only the needed decoding layers; wherein fewer than all the decoding layers specified in the access unit are needed to decode the access unit for user by the given device.

28. The system of claim 22, wherein a decoding layer comprises:
- an entropy decode module that provides macroblock header information to the decoding layer;
- wherein the decoding layer is configured to determine, based on the macroblock header information, whether to fetch decoding information generated by a prior decoding layer to process a current macroblock in the decoding layer.

* * * * *